United States Patent [19]

Swanningson

[11] 3,898,758

[45] Aug. 12, 1975

[54] FISHING LURE

[76] Inventor: Douglas Swanningson, 2611 75th St., Kenosha, Wis. 53140

[22] Filed: Apr. 17, 1974

[21] Appl. No.: 461,775

[52] U.S. Cl. ............. 43/42.48; 43/42.49; 43/43.12; 43/43.13
[51] Int. Cl............................................. A01k 85/00
[58] Field of Search............ 43/43.12, 43.13, 42.28, 43/42.48, 42.49, 42.47

[56] References Cited
UNITED STATES PATENTS

| | | | |
|---|---|---|---|
| 841,429 | 1/1907 | Passage | 43/42.49 |
| 1,320,804 | 11/1919 | Squarebriggs | 43/43.13 |
| 2,333,425 | 11/1943 | Jackson, Sr. | 43/42.28 |
| 2,545,185 | 3/1951 | Winslow | 43/43.13 |
| 3,628,274 | 12/1971 | Wojahn | 43/43.12 |

*Primary Examiner*—Warner H. Camp
*Attorney, Agent, or Firm*—Sherman & Shalloway

[57] ABSTRACT

A fishing lure for use with other similar fishing lures to form an array of lures which resemble a swimming school of fish when towed is manufactured of lead and molded to resemble a fish. The lure is provided with a dorsal fin having a hole therethrough located above the center of gravity of the lure to which a towing cable is attached. The tail is formed on the lure by a sheet of stainless steel which is embedded in the lead and to which a baited hook is detachably secured. The top surface of the lure includes a shelf portion which extends rearwardly from the fore end of the lure and an elongated depression which extends rearwardly along the body of the lure. The lure is so configured so as to remain generally beneath a boat towing the lure and within a 7° detection cone generated by a fish finding sonar device carried by the boat.

6 Claims, 8 Drawing Figures

PATENTED AUG 12 1975

3,898,758

SHEET 1

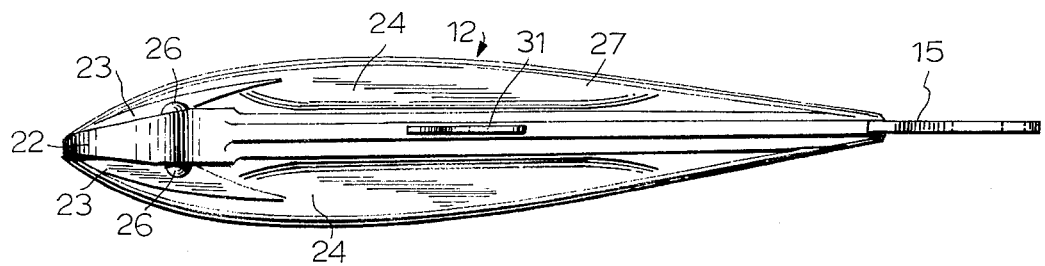
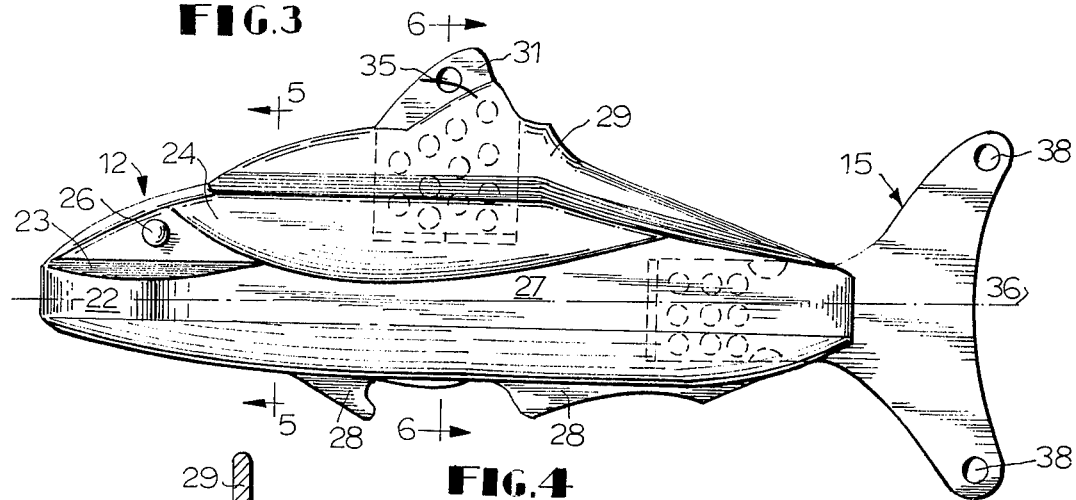
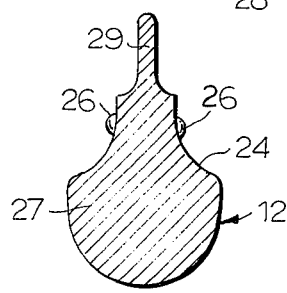
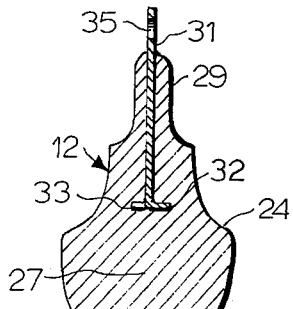
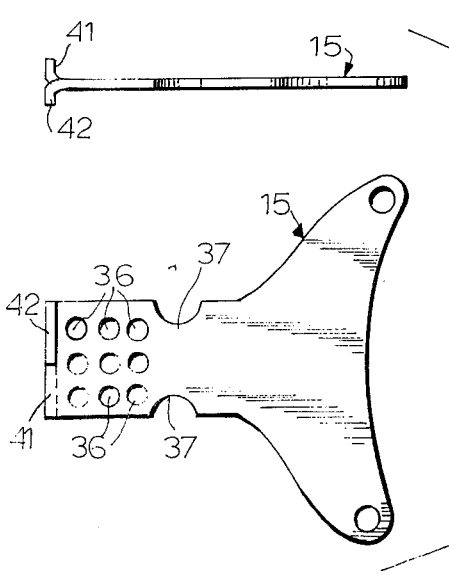
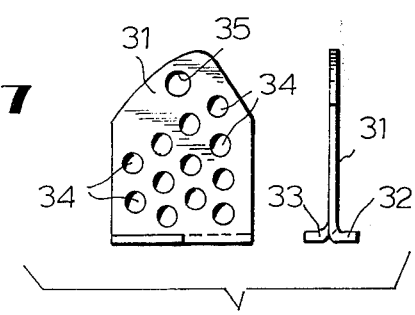

FISHING LURE

BACKGROUND OF THE INVENTION

1. Field of the Invention

This invention relates to fishing lures. More particularly, this invention relates to sinkers which are configured as fishing lures and are utilized in trolling for fish.

2. Technical Considerations and Prior Art

In trolling for fish, it is a general practice to tow lures which resemble fish through the water so as to attract live fish which attempt to feed on the lures. In order for the lures to be effective, they must bear a strong resemblance to live fish in both appearance and sound. Fish, such as salmon and trout, tend to feed on schools of other fish. Consequently, lures which are used to attract salmon, trout and other fish like them are necessarily most effective when towed through the water in an array which resembles a school of fish.

In order to mimic a school of fish adequately, the lures must move in concert so that each individual lure has the same movements as the other lures. For example, when the boat from which the lures are being towed turns to starboard, the lures themselves must also turn to starboard. However, their motion should resemble the motion of a school of fish in that those closest to the point about which the boat turns should turn rather sharply with a relatively slow forward speed, and those furthest from the turning radius should turn less sharply with an increased forward speed. If this can be accomplished, then a school of lures will be well on the way to greatly deceiving live feeding fish.

When trolling for deep feeding fish, it is necessary that the lures resist the tendency to ride upwardly as they are towed so that they can remain at depths in which the game fish feed. It is also necessary that the lures retain their fishlike resemblance while being towed and held submerged.

Modern fishermen frequently utilize sonar devices to detect and locate schools of feeding fish. In order for fishermen to most effectively use these sonar devices, it is highly desirable that the lures also be detected by the sonar devices so that the boat may be steered to position the lures among schools of game fish. Generally, these sonar devices can detect objects only within a cone having a relatively slight angle of, for example, 7°. The school of lures must therefor remain substantially under the towing boat or relatively close to the towing boat in order to be detected by the cone. Consequently, it is desirable to have lures which will not tend to trail far behind the trolling boat as they are towed.

In order for a lure to be most effective, it is necessary that the lure be easy to utilize and operate, and that the lure function at various trolling speeds so that no adjustments have to be made to each lure when the trolling speed is increased or decreased. When trolling with a school of lures, making adjustments can become quite tedious if each and every lure must be periodically adjusted in some way in order to function properly.

The prior art does not disclose any lures which will fulfill all of the above requirements. For example, the lure disclosed in U.S. Pat. No. 2,545,185, issued Mar. 13, 1951, discloses a lure which is bouyant and must be held down by a planing surface which detracts from the appearance of the lure. Furthermore, adjustments are required to the lure at different trolling speeds and for different conditions.

The prior also includes the following U.S. Pat. Nos. 2,605,557; 2,749,649; 2,786,296; 3,271,892; 3,659,370; and 3,745,688. These patents show various types of trolling lures. However, none of these lures meet all of the afore-mentioned requirements.

SUMMARY OF THE INVENTION

In view of the afore-mentioned considerations, it is an object of the instant invention to provide a new and improved fishing lure.

It is another object of the instant invention to provide a new and improved fishing lure which, when towed with other similar fishing lures, creates an impression of a school of swimming fish.

It is still another object of the instant invention to provide a new and improved fishing lure, wherein the lure is relatively simple in construction and easy to operate.

It is a further object of the instant invention to provide a new and improved fishing lure, wherein the fishing lure will remain submerged and relatively close to the trolling boat over a range of trolling speeds.

It is still a further object of the instant invention to provide a new and improved fishing lure, wherein the fishing lure resembles a live fish while static and while being towed through water.

It is an additional object of the instant invention to provide a new and improved fishing lure, wherein when the lure is towed with other lures to mimic a school of fish, the lure stays within the detection cone of a sonar fish-finding device.

In view of these and other objects, the present invention contemplates a lure for fishing, wherein the lure cooperates with other similar lures to resemble a school of fish when moved through water in the company of the other lures. The lure has a generally oblong body portion which resembles that of a fish, and is composed of dense material which is heavier than water. Attached to the body portion is a dorsal fin portion which projects above the body portion between the fore and aft ends thereof. The dorsal fin has a connection point for a cable through which the towing force is applied, the connection point being above the center of gravity of the lure. A tail portion of resilient material extends from the aft end of the body portion and cooperates with the body portion and the connection point to keep the body portion axially aligned with the direction of motion of the lure.

BRIEF DESCRIPTION OF THE DRAWINGS

FIG. 3 is a top view of the lure in accordance with the present invention;

FIG. 4 is a side view of the lure of FIG. 3;

FIG. 5 is a cross-section of the lure shown in FIG. 4 taken on lines 5—5;

FIG. 6 is a cross-section of the lure of FIG. 4 taken along the line 6—6;

FIG. 7 is a top and side view of the tail of the lure shown in FIGS. 3 and 4; and FIG. 8 is a side and front view of a dorsal fin shown in FIGS. 3 and 4.

DETAILED DESCRIPTION

Figure 1:
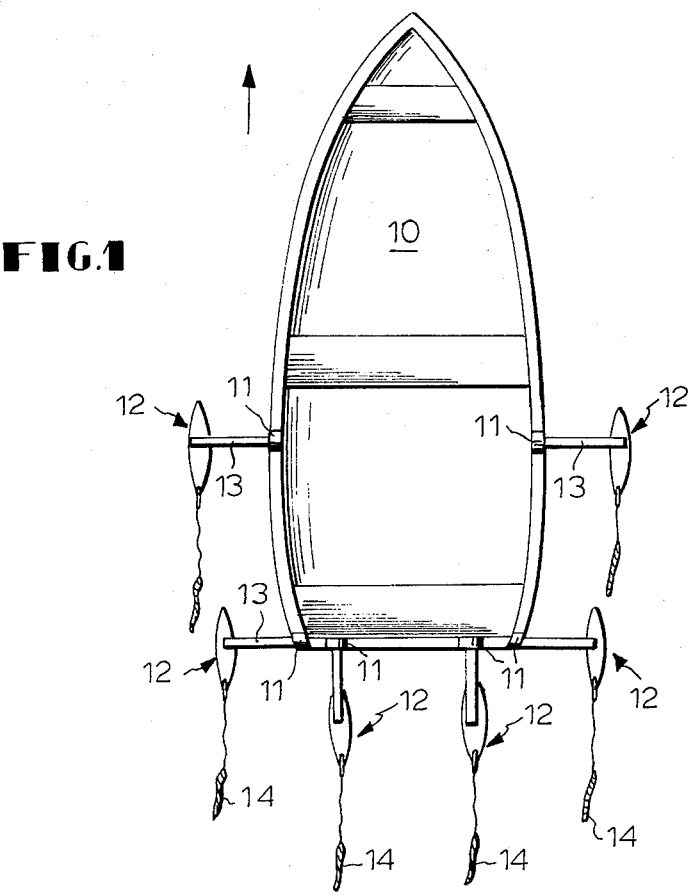
FIG. 1 is a top view of schematic illustration showing how the fishing lure of the present invention is towed through water by a boat in combination with other similar lures so as to resemble a school of swimming fish.

Referring now to FIG. 1, there is schematically shown a boat 10 having a plurality of reels 11 mounted thereon from each of which is towed a lure 12 having the characteristics of the lure of the instant invention. The reels 11 may perhaps be similar to the reels shown in U.S. Pat. No. 3,628,274, issued Dec. 21, 1971, and each may have an arm 13 which is slidably adjustable relative to the boat 10 in order to position the lures 12 laterally or longitudinally relative to the path of the boat 10. It should be kept in mind that the particular array of the lures 12 shown in FIG. 1 is schematic, and is meant to be illustrative only of a school of fish. The form that the array of lures 12 assumes to resemble a school of fish is a matter of choice of the fisherman.

Figure 2:
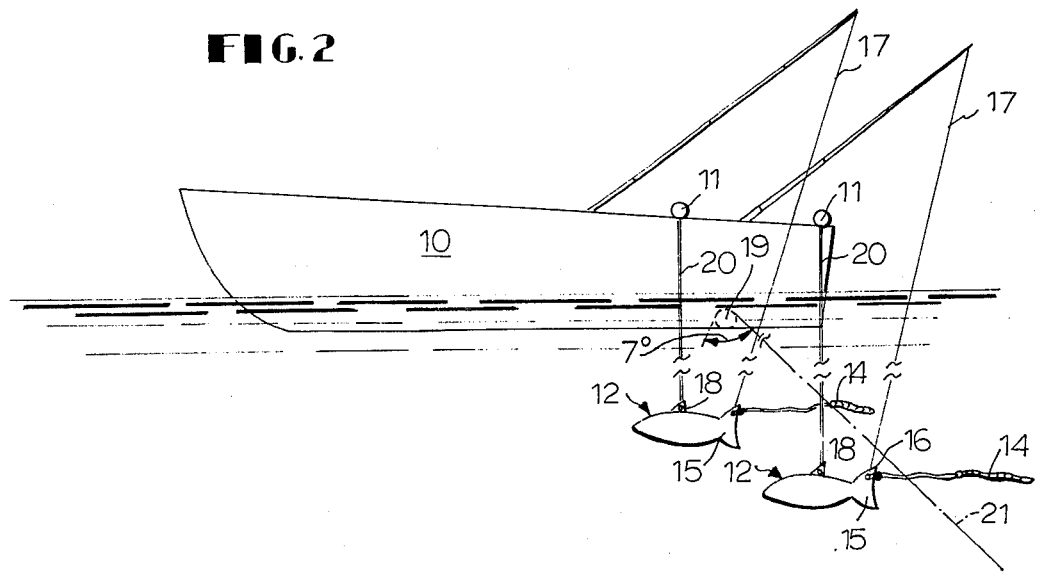
FIG. 2 is a side schematic illustration showing how the lures are towed so as to remain within the cone of a sonar detection device.

Referring now to FIG. 2, there is a side view schematically showing the method of fishing which utilizes the lures 12 of the instant invention. In this figure, each lure 12 has a hooked bait 14 extending from the tail 15 of the lure. The baits 14 may be, for example, surgical tubing or any other conventional or non-conventional type of bait or fish attracting material or substance. In the illustrated embodiment, the baits 14 are detachably connected to the tails 15 at couplings 16 so that when a pre-determined amount of force is applied to the bait upon a fish striking the bait, the couplings 16 detach from the tails 15. Each bait 14 has a fishing line 17 attached thereto so that after the fish is hooked on the bait 14, the fish may be reeled in by the line 17. It should be kept in mind that FIG. 2 is also merely illustrative of a method of using the lures 12. Instead of having the disconnect at 15, it could perhaps be possible to have a disconnect located at a dorsal fin 18, so that the fishing line 17 disconnects from the dorsal fin 18 instead of the coupling 16, while the bait 14 is still coupled to the coupling 16.

Still referring to FIG. 2, the boat 10 is schematically shown as having a sonar transducer 19 located near the stern thereof. The transducer 19 has a detection cone of approximately 7° extending downwardly from the boat. In order for the transducer 19 to be effectively used with a school of lures 12, the lures 12 must travel within the 7° cone generated by the transducer 19. For the sake of convenience, the lures 12 are usually towed from positions nearer the boat's stern than the boat's bow since the working area of most boats is concentrated near the stern. The lines or cables 20 from which the lures 12 are suspended from arms 13 are quite long in order to position the lures at depths where the fish feed and the lures will intersect the 7° cone, as shown by the lower broken portion of the cone 21. In order to remain within the cone 21 while being towed through the water, each of the lures 12 has a configuration according to the principles of the instant invention, as seen in FIGS. 3 through 6.

Referring now to FIGS. 3 and 4, there are shown top and side views of the lure 12 designed in accordance with the principles of the instant invention. The lure 12 is in the general streamline shape of a fish, and is made of a dense material, such as lead. According to a preferred embodiment, the lure 12 weighs approximately 12 pounds, is approximately sixteen inches long, has a maximum height of approximately 6 inches, and a maximum width of approximately two and one-quarter inches.

The lure 12 tapers forward from section 5—5 to form a nose portion 22. As seen in FIGS. 3 and 4, the nose portion 22 has a pair of shelves 23—23 which extend rearwardly along the nose portion and intersect a pair of concave, generally elongated depressions 24—24 that extend rearwardly toward the tail 15 of the lure 12. Integrally molded between the shelves 23 and the forward end of the depressions 24 are a pair of eyes 26.

The lure 12 has a relatively wide central body portion 27 along which the depressions 24 extend and into which the shelves 23 taper. From the body portion 27, a ventral fin 28 extends and, in the preferred embodiment, is integrally molded with the body portion 27. The ventral fin 28 tapers backwardly toward the tail 15 and resembles that of a real fish. Projecting upwardly from the body portion 27 is a dorsal fin 29, part of which is integrally molded with the body portion 27 and part of which is formed by a resilient plate 31. The plate 31 is preferably made of stainless steel, and is shown also in FIGS. 6 and 8. The dorsal fin 29 is configured to resemble that of a real fish, while the plate 31 serves to attach the fish to a towing cable 20 (see FIG. 2).

Since the lure 12 is made of lead and is therefor quite heavy, the plate 31 needs to be firmly anchored within the body portion 27 of the lure 12. This is accomplished by having flanges 32 and 33 extending in opposite directions from the plate 31 positioned at the bottom of the plate so as to resist forces tending to pull the plate 31 from the lure 12. The plate 31 also has a plurality of holes 34—34 bored therein into which the lead from which the lure 12 is formed flows as the lure is molded. The combination of the bores 34—34 and the flanges 33 and 32 serve to securely attach the plate 31 to the lure 12.

The plate 31 also has a towing hole 35 bored in the top portion thereof. The hole 35 is located above the center of gravity of the lure 12 so that, as the lure 12 is towed, the lure will tend to align its longitudinal axis 36 with its direction of motion and with the horizontal axis.

The body portion 27 tapers rearwardly and converges on the tail 15 which is preferably a flat plate made of stainless steel. The tail 15 is shown separately in FIG. 7, and has a plurality of holes 36—36 bored therethrough into which the lead flows as the lure 12 is molded and which assist in holding the tail 15 within the body portion 27, just as the holes 34 hold the plate 31 within the body portion. The plate 31 also has a pair of semi-circular cut-outs 37 into which the lead flows, and a pair of flanges 41 and 42 to help assure that the tail 15 will not become disengaged from the body portion 27. The tail 15 has a pair of holes 38 to which baits 14 (see FIGS. 1 and 2) may be secured. As previously mentioned, the baits 14 may be detachably secured to the holes 38 by couplings 16 so as to readily release from the lure 12 upon being struck by a feeding fish.

The various afore-mentioned portions of the lure 12 all cooperate to render the lure effective. In order to be effective, the lure must remain submerged as it is towed and it must preferably remain relatively close to the boat 10 towing it so as to be within the sonar cone 21 generated by the transducer 19 (see FIG. 2). One of the features according to the instant invention which assures the positioning of the lure 12 is its weight which is accomplished by molding the lure 12 substantially from lead. It should be kept in mind, however, that if it is desired to lighten the lure 12, the lure may be molded with a less dense core. For example, a bar of aluminum might be placed in the mold before the lead is poured so as to displace some of the lead with the less dense, lighter aluminum. By doing this, the weight of the lure 12 might be reduced from twelve to perhaps 8 pounds.

In addition to the weight of the lure 12, the specific shape of the lure cooperates with the weight to assure that the lure will move through the water with a generally horizontal attitude. As the lure is towed, the towing force will be applied at the hole 35 which is above the center of gravity. In order to keep the lure 12 facing forward as it is towed at 35, the center of pressure must be between the hole 35 and the end of the tail 15. The broad flukes of the tail provide a large area which helps keep the center of pressure back toward the rear of the lure, thereby assuring that the lure moves with the nose portion 22 forward. Furthermore, the tail portion 15 helps damp any tendency of the lure 12 to yaw excessively as the lure 12 is towed through the water by the cable 20.

Since the cable 20 applies the towing force above the center of gravity of the lure, there is a decrease in the tendency of the lure to flare and point its nose portion 22 upwardly as it is towed through the water. In addition, the concave depressions 24 extending along the body portion 27 of the lure and the shelves 23 extending along the nose portion 22 of the lure create a higher pressure flowing over the top surfaces of the lure than under the bottom surface of the lure as the lure is towed. This causes the lure to tend to remain down as it is towed instead of rising upwardly, as do conventional lures. The shelves 23 provide a surface that slightly increases pressure on the nose portion 22, and thus holds the nose portion 22 down, while the depressions 24 tend to move the vertical center of pressure slightly forward of the hole 35 which is mentioned before as the point at which the towing force is applied. The shelves 23 and depressions 24 accomplish their ends without adversely affecting the fish-like appearance of the lure 12 and, thus, do not present an unnatural appearance to feeding game fish.

All of the afore-mentioned features cooperate to provide a lure 12 which will function effectively, as explained with FIGS. 1 and 2, in cooperation with other lures to create the impression of a swimming school of fish. The lure 12 functions at trolling speeds of one to six knots and, thus, provides a very flexible arrangement. While, in the preferred embodiment, the lure remains its natural silver color, it may, if desired, be painted to increase its attractive qualities.

The above illustrations and descriptions are merely exemplary of one embodiment of the instant invention. It is to be understood that the invention is to be limited only by the following appended claims.

What I claim:

1. A lure for fish wherein the lure cooperates with other similar lures to resemble a school of fish when moved through water in the company of other lures, comprising:
   a generally oblong body portion which resembles that of a fish wherein said body portion is composed substantially of a dense material heavier than water and wherein said body portion is tapered toward fore and aft ends;
   a dorsal fin portion projecting above said body portion between said fore and aft ends, said dorsal fin portion having a connection point therein positioned at the longitudinal center of gravity of said lure, wherein said connection point provides a location at which towing force is applied;
   a pair of elongated depressions on each side of said body portion extending therealong beneath the dorsal fin to create a high pressure area for holding the lure down as the lure is towed; and
   a tail portion of resilient material extending from said aft end of said body portion and diverging away from said body portion, said tail portion cooperating with said body portion to align said body portion axially with the direction of movement of said lure by shifting the center of pressure aft of the connection point at which the towing force is applied.

2. The lure of claim 1, wherein the fore end of said body portion includes a pair of tapered shelf portions on each side which face upwardly and terminate beneath the elongated depressions which create a high pressure area at the force end of the lure to help keep the fore end down as the lure is towed.

3. The lure of claim 1, wherein the dense material is lead.

4. The lure of claim 3, wherein the dorsal fin portion is made of a resilient material which has flanges on one end to anchor the dorsal fin portion in the body portion and a plurality of holes therein into which the lead flows to ensure a rigid connection between the fin and body portion.

5. The lure of claim 3, wherein the tail portion includes cut-outs and a plurality of holes therein into which the leads flow to secure the tail portion within the body portion.

6. The lure of claim 1, wherein the tail portion includes means for connecting a detachable baited hook thereto.

* * * * *